US011182042B2

(12) United States Patent
Schilling et al.

(10) Patent No.: US 11,182,042 B2
(45) Date of Patent: Nov. 23, 2021

(54) APPLICATION INPUT AND FEEDBACK SYSTEM

(71) Applicant: SAP SE, Walldorf (DE)

(72) Inventors: Nicole Schilling, Walldorf (DE); Johann Kemmer, Mühlhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/452,972

(22) Filed: Jun. 26, 2019

(65) Prior Publication Data

US 2020/0409510 A1 Dec. 31, 2020

(51) Int. Cl.
*G06F 3/048* (2013.01)
*G06F 3/0481* (2013.01)

(52) U.S. Cl.
CPC ................. *G06F 3/0481* (2013.01)

(58) Field of Classification Search
CPC ...... G06F 3/048; G06F 3/0481; G06F 3/0488; G06F 3/017; G06F 9/44; H04L 67/10
See application file for complete search history.

(56) References Cited

U.S. PATENT DOCUMENTS

| 7,085,820 B1 * | 8/2006 | Nickerson | G06F 16/958 |
| | | | 709/219 |
| 7,827,487 B1 * | 11/2010 | Nickerson | G06F 16/95 |
| | | | 715/711 |
| 8,713,438 B1 * | 4/2014 | Broniek | G06F 40/169 |
| | | | 715/715 |
| 9,811,352 B1 * | 11/2017 | Sharifi | G06F 16/957 |
| 10,019,716 B1 * | 7/2018 | Ainslie | G06Q 30/016 |
| 10,373,213 B2 * | 8/2019 | Ekambaram | G06F 3/012 |
| 2008/0141221 A1 * | 6/2008 | Benesovska | G06F 9/45512 |
| | | | 717/124 |
| 2008/0320343 A1 * | 12/2008 | Eickmeyer | G06F 11/0781 |
| | | | 714/57 |
| 2009/0235236 A1 * | 9/2009 | Nickerson | G06Q 10/00 |
| | | | 717/128 |
| 2010/0229112 A1 * | 9/2010 | Ergan | G06F 11/0748 |
| | | | 715/764 |
| 2011/0246901 A1 * | 10/2011 | Gichuhi | G06Q 30/02 |
| | | | 715/738 |
| 2012/0123823 A1 * | 5/2012 | Finkelstein | G06Q 30/02 |
| | | | 705/7.32 |
| 2014/0298093 A1 * | 10/2014 | Cook | G06F 11/36 |
| | | | 714/27 |
| 2015/0264133 A1 * | 9/2015 | Chen | G06F 3/04883 |
| | | | 715/748 |

(Continued)

*Primary Examiner* — Mahelet Shiberou
(74) *Attorney, Agent, or Firm* — Sterne, Kessler, Goldstein & Fox P.L.L.C.

(57) ABSTRACT

Disclosed herein are system, method, and computer program product embodiments for providing an application input and feedback system. An embodiment operates by receiving a request for a user input interface corresponding to a particular screen of an application. Responsive to the request, the user input interface associated with the particular screen is provided. A real-time context corresponding to the particular screen of the application and the request is captured. User-generated data is received via the user input interface and a context-related data package including the user-generated data and the context is generated. The context-related data package is provided to another system configured to receive the context-related data package.

20 Claims, 3 Drawing Sheets

(56) References Cited

U.S. PATENT DOCUMENTS

| | | | |
|---|---|---|---|
| 2015/0347367 A1* | 12/2015 | Berke | G06F 40/169 |
| | | | 715/771 |
| 2016/0291937 A1* | 10/2016 | Khanna | G06F 9/451 |
| 2016/0299756 A1* | 10/2016 | Surazski | G06F 8/71 |
| 2017/0178205 A1* | 6/2017 | Brandish | G06Q 30/02 |
| 2017/0214758 A1* | 7/2017 | Engel | H04L 67/22 |
| 2020/0304448 A1* | 9/2020 | Zhang | H04L 51/26 |

\* cited by examiner

APPLICATION INPUT AND FEEDBACK SYSTEM

BACKGROUND

Most applications that request feedback from users interrupt the user's activities with a pop-up notification or other interruptive request. However, this type of feedback can disrupt a user's flow and experience with using the application, as well as consume additional bandwidth or processing resources especially if the notification is processed and displayed and the user then ignores or closes the notification without providing any feedback.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an application input and feedback system.

Figure 1:
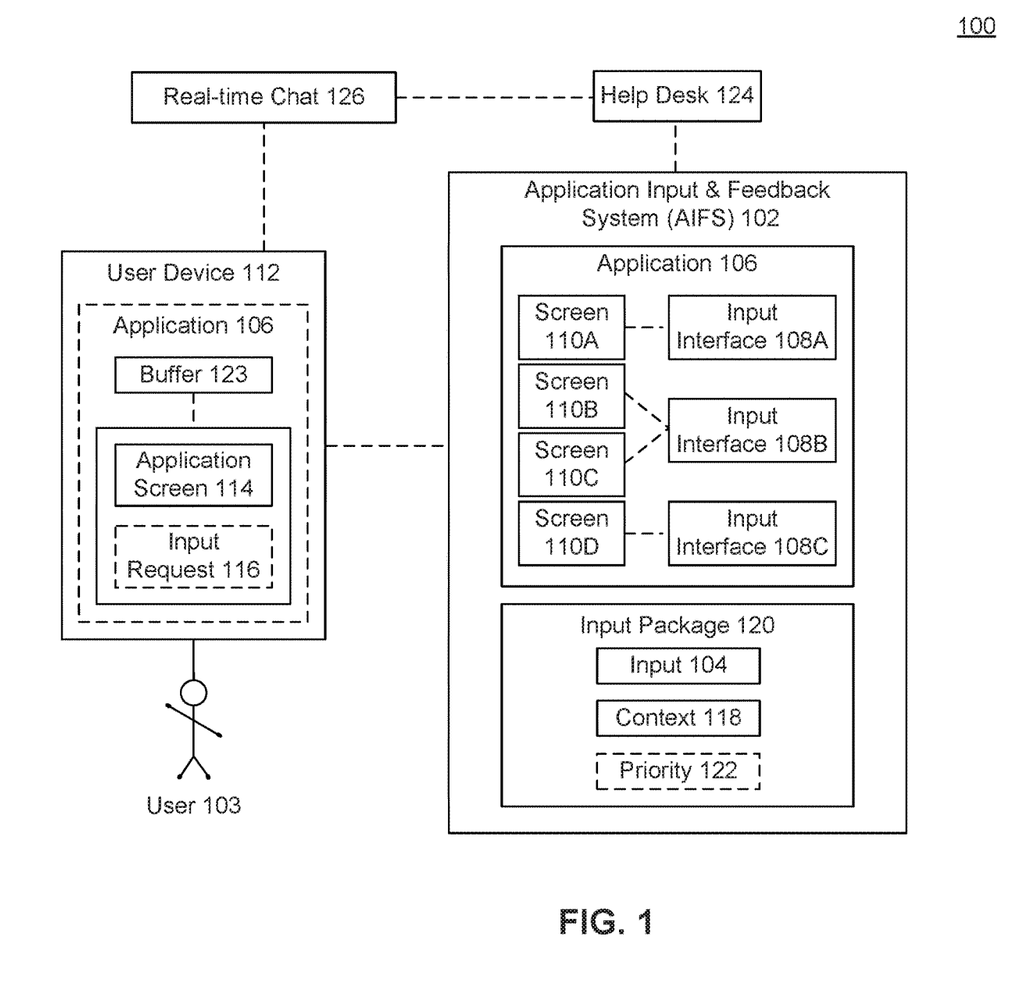
FIG. 1 is a block diagram illustrating example functionality for providing an application input and feedback system (AIFS), according to some embodiments.

FIG. 1 is a block diagram 100 illustrating example functionality for providing an application input and feedback system (AIFS), according to some embodiments. In some embodiments, rather than interrupting a user during their use of an application 106, or waiting until the application 106 crashes to request feedback, application feedback system (AIFS) 102 enables a user 103 to control when the user 103 wants to provide input 104 about an application 106 or user device 112.

Rather than interrupting the user 103 with unsolicited and annoying pop-ups or feedback requests that may interrupt the user's flow and degrade the user's experience with application 106 or user device 112, AIFS 102 enables user 103 to request the opportunity to provide feedback or input at any time while application 106 open, operating, or executing on a computing device 112.

Further, rather than providing a generic feedback or user input interface, AIFS 102 may provide customized input interfaces 108 that request or enable a user 103 to provide direct and context-specific user feedback. For example, input interfaces 108 are configured with feedback or input questions or data based on when a input request 116 from user 103 is detected. Input interfaces 108 may include different types of questions depending on the context in which the user is providing input 104. For example, checkbox questions may be directed to quality, usability and printing functions, multiple choice questions may be directed to eliciting input 104 on performance, user interface, and user interaction features, and a comment function may directed to particular functionality, business process relevance, and extensibility. In addition, a freeform or comment function may enable a user 103 to enter any other input 104 the user desires, such as improvement suggestions, etc.

In an embodiment, different feedback or input interfaces 108 may exist for different interfaces or screens 110 of the application 106. For example, if a finance tab or screen 110A of application 106 is active as application screen 114, a first input interface 108A may be provided. However, if a human resources tab or screen 110D is open when a input request 116 is detected, then input interface 108C may be provided.

In another embodiment, different input interfaces 108 may correspond to which recent user action(s) or executed functions were monitored, performed, executed, requested, logged, or detected. For example, if a user executes a save command, input interface 108A may be displayed which may be different than from the input interface 108B that may appear if the user recently executes or requests an edit field command, or open file command.

In an embodiment, user 103 may be operating or accessing application 106 from a user device 112. Application 106 may include any program or application, including a web or cloud-based applications, or an app operating on a mobile phone, laptop computer, desktop computer, smart television, internet of things (IoT) device, or other computing device 112. In an embodiment, as illustrated in FIG. 1, application 106 may be accessible either locally and/or via a network connection on user device 112. In an embodiment, application 106 may be an interface through which to operate user device 112 or another device (e.g., such as an interface on a remote control operating a television).

During the execution or operation of application 106 on user device 112, user 103 may have noticed an error, have a question, have a recommendation or have other feedback, input, or other user-generated data that the user 103 wants to provide to the developer, manufacturer, or application or service provider. AIFS 102 may enable the user 103 to initiate a input request 116 by selecting a menu or button from an application screen 114, selecting one or more key combinations from a remote control or from user device 112, or issuing a voice command indicating that user 103 desires to submit feedback or input 104.

in an embodiment, application 106 may include predetermine key combinations that may be sequentially or simultaneously entered on a keyboard or touchscreen interface which activate a input request 116. For example, a user 103 may select both the X and O keys simultaneously on a keyboard or touchscreen interface or remote control to activate a input request 116. In another embodiment, a user 103 may select a particular button or menu item from an interface of application 106 to activate input request 116.

AIFS 102 may enable a vendor or manufacturer of a particular user device 112 or software or firmware (e.g., application 106) operating on the user device 112 to cluster user input 104 according to the context (e.g., screen 110 or commands associated with the input requests 116). Input 104 may include any feedback or user-generated data as provided by one or more users of a system including, text, voice, video, images, or other multimedia input. The manufacturer or service provider may further assign priorities to and process the various input 104 more efficiently than if random or generic feedback or input was requested by addressing the most important glitches or improvement requests first and identifying similarities and differences in input 104 received from similar contexts.

In an embodiment, user 103 may be operating user device 112 or application 106 on user device 112, and may indicate a input request 116 by performing a particular action or selecting a particular button or menu command. The user input 104 may be collected by an extensible markup language (XML) engine, and grouped into intelligent clusters (e.g., based on the context related to the input 104).

In an embodiment, once a particular threshold (e.g., passage of time or number of grouped feedbacks or inputs 104 exceeds a pre-designated number), AIFS 102 may provide grouped clusters to a help desk 124 where it is analyzed by application developers or other support staff, and turned into action items to improve, change, or upgrade user device 112 and/or application 106.

Application 106 may detect a input request 116 in which the user has performed a positive action indicating a request to provide feedback or input about the operation of application 106 and/or user device 112. Upon receiving request 116, AIFS 102 may identify which screen 110A-D of application 106 the user was accessing at or around a time when the request 116 was detected. Or for example, AIFS 102 may identify which functions of application 106 and/or user device 112 were recently requested or executed by user 103 prior to the detection of input request 116.

In an embodiment, upon identifying a particular application screen 114 executing on application 106 at user device 112 at or around the time of detecting input request 116, AIFS 102 may identify a corresponding input interface 108A-C for the identified screen 110A-D that may be have been displayed on user device 112. In another embodiment, rather than or in addition to identifying the active screen 110 on user device 112, AIFS 102 may identify which function(s) of application 106 were recently requested or executed, and provide the corresponding input interface 108A-C responsive to the input request 116.

In an embodiment, application 106 may be configured with different input interfaces 108 for different screens 110 and/or function requests that provide the user with the ability to provide contextually relevant input or feedback. The contextually relevant feedback or input may include questions that about the particular screen 110, requests to rate the operation or satisfaction with the execution of a particular function, etc.

Thus, rather than providing a generic input or feedback interface, AIFS 102 may provide a user with a context, function and/or screen specific input interface 108, which will improve user engagement, feedback, input, and be relevant to the user input requests 116. The input interfaces 108 may include screenshots, a list of recently requested actions, and/or pre-configured questions that are about the user experience with the application 106 and/or the active screen 114. Input interfaces 108 may also include blocks where the user can free type or speak feedback, input, or comments.

In an embodiment, detecting a input request 116 may cause application 106 to take a screenshot of application screen 114 and/or save a state of application 106 at a time when request 116 was detected. In an embodiment, context 118 may include data that has been provided by a user 103 or entered into one or more fields of application screen 114.

In an embodiment, application 106 may include a buffer 123 that monitors and records user actions and/or application states (including which screens 114 were displayed) for a period of time prior to and/or after input request 116. Then, for example, upon receiving or detecting a input request 116, AIFS 102 may access buffer 123 to determine sequences of events or user actions that preceded the input request 116.

In an embodiment, buffer 123 may capture information about the (broader) business context or the portions of an interface of application 106 with which user 103. This may include information about the business object for which user 103 is entering data for and in which business process the current user interaction is embedded. The business process context could be derived from or include references contained in the business object and visualized in a graphical manner, like with chevrons.

In an embodiment, AIFS 102 may present to user 103 a display of the buffered actions and/or screens that preceded input request 116 and may enable user 103 to select which action and/or screen is most relevant to the request 116. In an embodiment, the most recent action may be selected as a default action about which input 104 is directed. In another embodiment, a user may select 'none' if the input 104 is not related to any action the user recently performed.

In an embodiment, AIFS 102 may determine based at least in part on the buffered actions (performed by user 103) prior to detecting input request 116 to determine what type of question(s) or which questions to provide via an input interface 108. For example, as noted above, if a user attempted or performed a print function or print action, then one or more preconfigured, print-related checkbox questions may be provided. However, if the user 103 was accessing a business process interface, then one or more comment boxes may be provided via an input interface 108.

Through a input interface 108, user 103 may provide input 104 in different forms. For example, as noted above, the input 104 may include answers to preconfigured questions, freeform input, voice input, video input, input about bugs, recorded input of user interactions with application 106, input about user questions, and/or input about new features or improvements the user 103 wants to request for application 106 and/or user device 112.

This user input 104 may be captured by AIFS 102 and combined with a context 118. Context 118 may include any relevant screenshots, system states, data, or sequence of user actions captured by buffer 123 before, during, or after input request 116.

For example, buffer 123 may continue recording or monitoring user actions after a input request 116 has been detected and after input 104 has been received, and AIFS 102 may combine this information with previously captured actions as context 118. This may help identify how a user responds to the bug or glitch in application 106 that the user 103 has identified (e.g., whether continuing operating the application 106, quitting the application 106, or performing a particular sequences of user actions after the request 116).

AIFS 102 may combine input 104 and context 118 into a input package 120. Feedback package 120 may include all the information determined to be relevant to a particular input request 116. Feedback package 120 may include information such as user IDs, request and/or feedback or input time, and previous inputs 104 received about a particular context 118 (e.g., screen, function, or user device 112) or from a particular user 103 or group of users (e.g., users from the same company or within the same age range).

in an embodiment, input package 120 may be assigned a priority 122 Priority 122 may be assigned based on a role of the user 103 within the context of an organization, the application screen 114 and/or user actions or functions determined from the user context 118, the time of day, or other factors (e.g., such as user selection of priority).

In an embodiment, input package 120 may then be queued and provided to a help desk 124 based on priority 122. Help desk 124 may be any department or users associated with providing, developing, or troubleshooting and/or improving user device 112 and/or application 106. In an embodiment, help desk 124 may include application developers who may change the code, interface, or operations of application 106. Help desk 124 may include an administrator device of an individual who can change user 103 permissions or content access. In another embodiment, help desk 124 may include human resources individuals, depending on the context 118 or nature of input 104.

In an embodiment, help desk 124 may include a group of one or more individuals who may be reading processing input packages 120 that meet or exceed a particular priority 122 threshold in real-time. Then for example, based on input 104, AIFS 102 may open a real-time chat window 126 between user 103 and one or more help desk workers. AIFS 102 may thus enable high priority 122 issues to be resolved in real-time, while lower priority 122 issues are placed in a queue.

In an embodiment, input interface 108 may include an option for a user to select if the user is open to accepting real-time chat 126 requests in response to input 104. In another embodiment, user 103 may specifically request a real-time chat 126 or phone call to discuss input 104 in greater detail with a help desk worker.

if additional information is needed for lower priority 122 issues or issues for which a user 103 has declined real-time chat 126, these may be requested via e-mail at a later time, rather than through a real-time chat 126 window which may pop-up during the execution of application 106.

Figure 2:
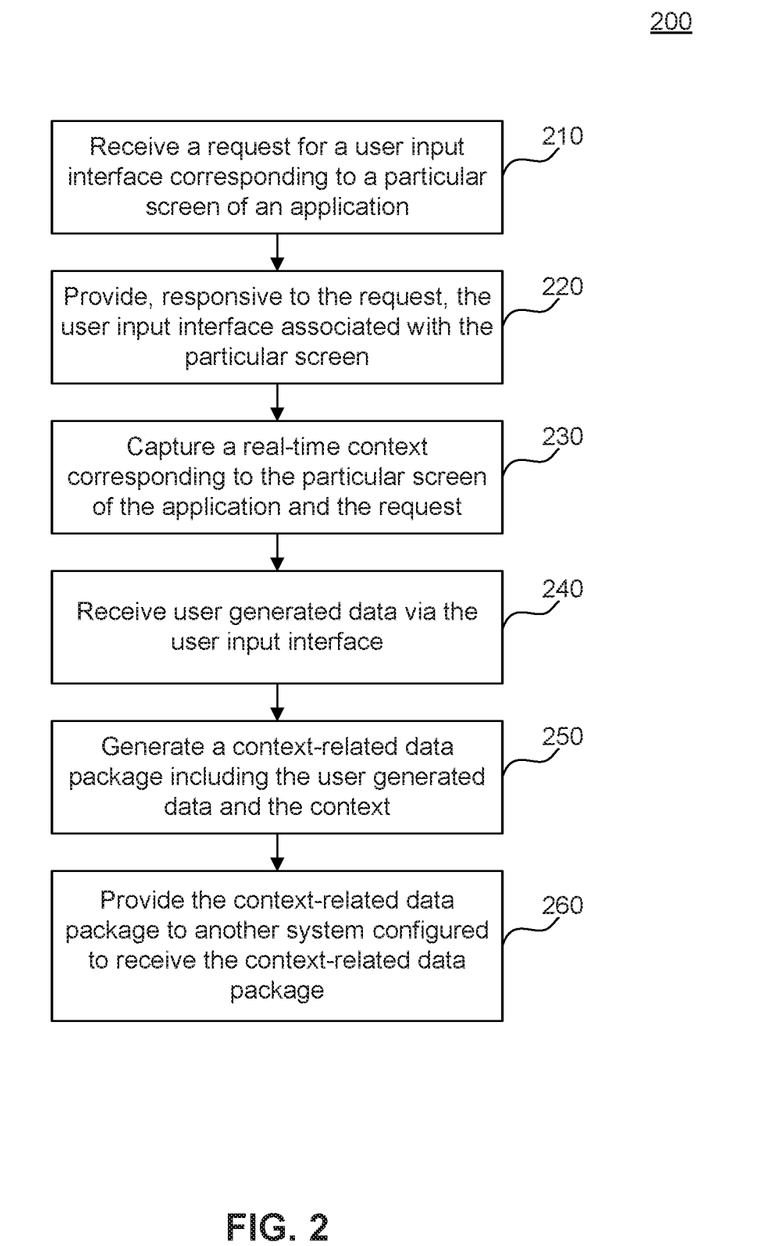
FIG. 2 is a flowchart illustrating example operations of an application input and feedback system (AIFS), according to some embodiments.

FIG. 2 is a flowchart 200 illustrating example operations of a system for providing data collection and integration functionality, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a request for a user input interface corresponding to a particular screen of an application is received. For example, user device 112 may detect that a combination of buttons on user device or on a remote control may be selected by a user 103 to indicate that the user 103 wants to provide input 104. Or, for example, user 103 may speak a command such as "feedback" or "input" or "improvement" to activate AIFS 102, Rather than wasting resources by prompting a user 103 to provide feedback or input, and degrading the user's experience, AIFS 102 enables a user 103 to request when the user wants to provide input.

In 220, responsive to the request, the user input interface associated with the particular screen is provided. For example, AIFS 102 may determine which user actions were recently performed and/or which screen 110A-D is or was recently active on user device 112 as application screen 114. Based on this, AIFS 102 may identify a corresponding or most relevant input interface 108A-C. In an embodiment, AIFS 102 may provide a display of various recent actions or screens 110A-D, and enable a user 103 to select any or all screens 110 and/or actions that are relevant to the input 104 user 103 wants to or is providing.

In 230, a real-time context corresponding to the particular screen of the application and the request is captured. For example, AIFS 102 may receive a sequence of recently executed functions, user actions, provided data, or accessed screens 10 from buffer 123 which may have been captured prior to the detection of input request 116, and may be stored as context 118.

In 240, user-generated data is received via the user input interface. For example, user 103 may provide information, respond to questions, upload files, or provide other video, audio, textual input 104 which is captured via a input interface 108.

In 250, a context-related data package including the user-generated data and the context is generated. For example, AIFS 102 may combine or link input 104 received from a user 103 with contextual information 118 about the input 104 in a context-related data or input package 120, which may include one or more tiles including the relevant feedback information.

in 260, the input package is provided to another system configured to receive the context-related data package. For example, input package 120 may be provided to a help desk 124 for processing. In an embodiment, based on priority 122, help desk 124 may perform real-time and/or queued or delayed processing of input packages 120.

Figure 3:
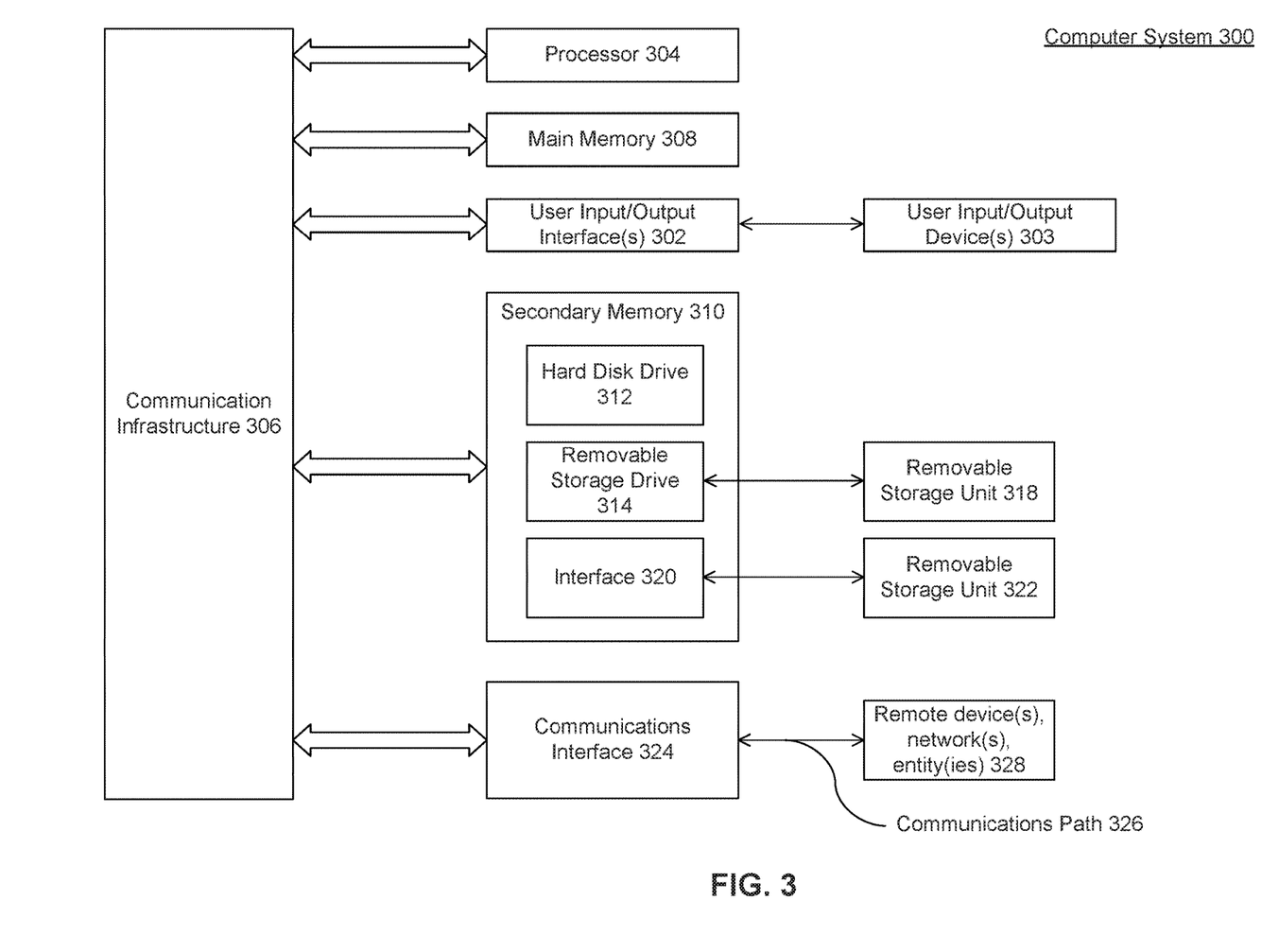
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
automatically buffering one or more user actions performed on a particular screen of an application prior to receiving a comment request from a user in a memory buffer;
receiving the comment request corresponding to the particular screen of an application;
identifying, from the memory buffer, the one or more user actions performed prior to receiving the request;
providing, responsive to the request, the user input associated with the particular screen;
capturing a real-time context corresponding to the particular screen of the application and the request;
receiving user-generated data via the user input;
automatically generating a context-related data package including the user-generated data, the context, and the one or more buffered user actions;
displaying the buffered actions, including one or more screens of the application associated with the buffered actions responsive to receiving the request by a user to provide the user input, wherein each screen includes one or more preconfigured questions through which to receive the user input;
receiving, from the user, a selection of one or more of the displayed buffered actions most relevant to the request and for which feedback is received from the user; and
providing the context-related data package, including the one or more buffered user actions, to another system configured to receive the context-related data package.

2. The method of claim 1, wherein the request comprises a user-initiated request.

3. The method of claim 1, wherein the capturing comprises:
capturing a screenshot of the particular screen responsive to the request, wherein the context-related data package includes the screenshot.

4. The method of claim 1, wherein the capturing comprises:
determining data that has been entered into one or more fields of the particular screen, wherein the context-related data package includes the determined data.

5. The method of claim 1, wherein the capturing comprises:
identifying one or more user actions buffered prior to receiving the request;
determining a type of feedback question to provide based on the one or more user actions buffered prior to receiving the request;
providing the type of feedback questions; and
determining that at least a portion of the user-generated data is received responsive to the provided type of feedback questions.

6. The method of claim 5, further comprising:
capturing one or more user actions performed subsequent to receiving the user-generated data.

7. The method of claim 1, wherein the providing comprises:
providing the context-related data package to an administrator device; and
providing a real-time communication link between a user device executing the application and the administrator device.

8. The method of claim 1, further comprising:
recording one or more additional user actions received after the selection has been received, wherein the context-related data package includes the recorded one or more additional user actions.

9. The method of claim 1, further comprising:
determining a role associated with user; and
assigning the context-related data package a priority based on the role.

10. The method of claim 1, further comprising:
determining a type of feedback question to provide based on the received selection of one or more of the displayed buffered actions most relevant to the request.

11. A system comprising:
a memory; and
at least one processor coupled to the memory and configured to perform operations comprising:
automatically buffering one or more user actions performed on a particular screen of an application prior to receiving a comment request from a user in a memory buffer;
receiving the comment request corresponding to the particular screen of an application;
identifying, from the memory buffer, the one or more user actions performed prior to receiving the request;
providing, responsive to the request, the user input associated with the particular screen;
capturing a real-time context corresponding to the particular screen of the application and the request;
receiving user-generated data via the user input;
automatically generating a context-related data package including the user-generated data, the context, and one or more of the plurality of buffered user actions;
displaying the buffered actions, including one or more screens of the application associated with the buffered actions responsive to receiving the request by a user to provide the user input, wherein each screen includes one or more preconfigured questions through which to receive the user input;
receiving, from the user, a selection of one or more of the displayed buffered actions most relevant to the request and for which feedback is received from the user; and
providing the context-related data package, including the one or more of the plurality of buffered user actions, to another system configured to receive the context-related data package.

12. The system of claim 11, wherein the request comprises a user-initiated request.

13. The system of claim 11, wherein the capturing comprises:
capturing a screenshot of the particular screen responsive to the request, wherein the context-related data package includes the captured screenshot.

14. The system of claim 11, wherein the capturing comprises:
determining data that has been entered into one or more fields of the particular screen, wherein the context-related data package includes the determined data.

15. The system of claim 11, wherein the capturing comprises:
identifying one or more user actions buffered prior to receiving the request;
determining a type of feedback question to provide based on the one or more user actions buffered prior to receiving the request;
providing the type of feedback questions; and
determining that at least a portion of the user-generated data is received responsive to the provided type of feedback questions.

16. The system of claim 15, the operations further comprising:
  capturing one or more user actions performed subsequent to receiving the user-generated data.

17. The system of claim 11, wherein the providing comprises:
  providing the context-related data package to an administrator device; and
  providing a real-time communication link between a user device executing the application and the administrator device.

18. A non-transitory computer-readable device having instructions stored thereon that, when executed by at least one computing device, cause the at least one computing device to perform operations comprising:
  automatically buffering one or more user actions performed on a particular screen of an application prior to receiving a comment request from a user in a memory buffer;
  receiving the comment request corresponding to the particular screen of an application;
  identifying, from the memory buffer, the one or more user actions performed prior to receiving the request;
  providing, responsive to the request, the user input associated with the particular screen;
  capturing a real-time context corresponding to the particular screen of the application and the request;
  receiving user-generated data via the user input;
  automatically generating a context-related data package include including the user-generated data, the context, and one or more of the plurality of buffered user actions;
  displaying the buffered actions, including one or more screens of the application associated with the buffered actions responsive to receiving the request by a user to provide the user input, wherein each screen includes one or more preconfigured questions through which to receive the user input;
  receiving, from the user, a selection of one or more of the displayed buffered actions most relevant to the request and for which feedback is received from the user; and
  providing the context-related data package, including the one or more of the plurality of buffered user actions, to another system configured to receive the context-related data package.

19. The device of claim 18, wherein the request comprises a user-initiated request.

20. The device of claim 18, wherein the capturing comprises:
  identifying one or more user actions buffered prior to receiving the request;
  determining a type of feedback question to provide based on the one or more user actions buffered prior to receiving the request;
  providing the type of feedback questions;
  determining that at least a portion of the user-generated data is received responsive to the provided type of feedback questions; and
  capturing one or more user actions performed subsequent to receiving the user-generated data.

\* \* \* \* \*